(12) United States Patent
Husney

(10) Patent No.: US 8,849,301 B2
(45) Date of Patent: Sep. 30, 2014

(54) LOCATION-BASED HOME SERVICES AND ENERGY MANAGEMENT

(75) Inventor: Jordan Husney, Minneapolis, MN (US)

(73) Assignee: Digi International Inc., Minnetonka, MN (US)

( * ) Notice: Subject to any disclaimer, the term of this patent is extended or adjusted under 35 U.S.C. 154(b) by 200 days.

(21) Appl. No.: 13/286,650

(22) Filed: Nov. 1, 2011

(65) Prior Publication Data
US 2013/0109404 A1    May 2, 2013

(51) Int. Cl.
*H04W 4/02*  (2009.01)
*H04W 4/00*  (2009.01)

(52) U.S. Cl.
CPC ............... *H04W 4/02* (2013.01); *H04W 4/008* (2013.01)
USPC .......................... 455/456.1; 700/275; 709/245

(58) Field of Classification Search
USPC ........ 455/456.1; 709/245, 249, 250; 700/275; 236/47
See application file for complete search history.

(56) References Cited

U.S. PATENT DOCUMENTS

2005/0091411 A1*  4/2005  Michaiel et al. .............. 709/249
2011/0178640 A1*  7/2011  Schmidt ....................... 700/275

* cited by examiner

*Primary Examiner* — Phuoc H Doan
(74) *Attorney, Agent, or Firm* — Fogg & Powers LLC

(57) ABSTRACT

In one example, wireless mobile device data is provided to a building control system by sending location data from a wireless mobile device to an Internet-based service, receiving the location data from the wireless mobile device in the Internet-based service, determining an associated building control system from the wireless mobile device identity, sending data derived from the location data to the building control system, and implementing a change in the building control system based on the sent data derived from the location data.

18 Claims, 2 Drawing Sheets

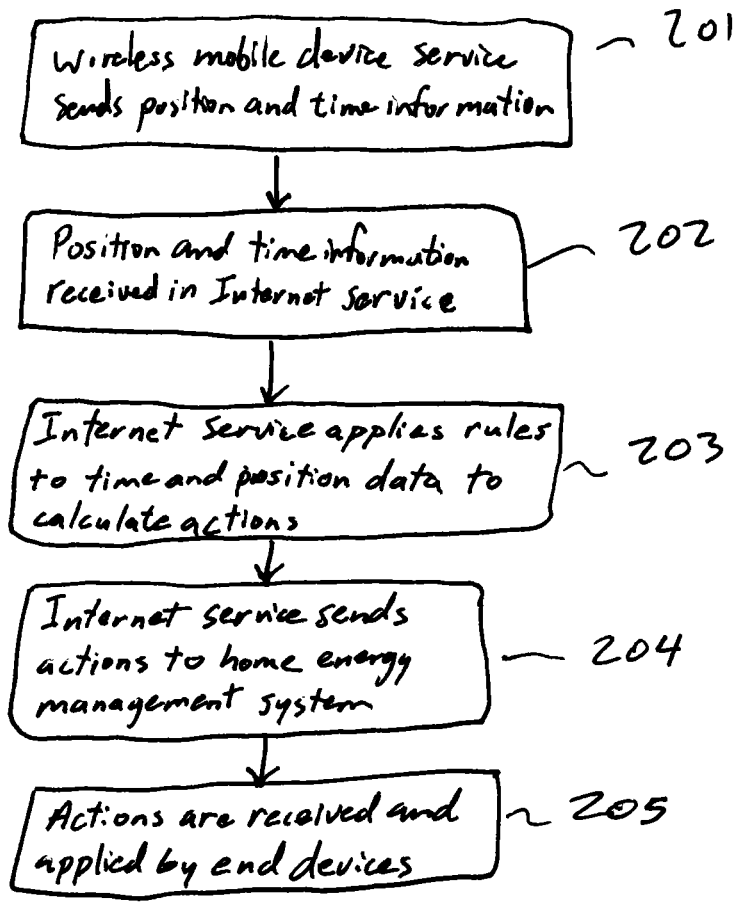

LOCATION-BASED HOME SERVICES AND ENERGY MANAGEMENT

FIELD OF THE INVENTION

The invention relates generally to control of energy, utility, and other home services, and more specifically in one embodiment to location-based home energy and services management.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Wi-Fi networks enable a Wi-Fi equipped device such as a laptop computer, set-top box, or smart phone to communicate with a wireless gateway to a network such as the Internet, and cellular telephones and tablet computers use cellular data networks to provide similar access to the Internet and to provide other services such as text and multimedia messaging and phone service.

A single device such as a smart phone can include multiple technologies for communicating with other devices, such as a cellular modem for phone calls, messaging, and Internet service, Wi-Fi for email, web browsing, and other Internet services, and Bluetooth for communicating with a wireless headset or car audio system. A car can similarly include Bluetooth for interacting with a passenger's cell phone to provide calling or media playing capabilities, a wireless cellular modem for communicating vehicle accident information, contacting emergency services, or remote vehicle control such as unlocking the doors or disabling the vehicle, and other such communication technologies.

But, these technologies typically require a user to run a certain application or perform another such action to use one device to control or interact with another, such as running a web browser to access the Internet, associating a car's Bluetooth system with a cellular phone and using buttons or voice control to place a call, or actuating a button to contact emergency services via a car's cellular network system.

In a further example, a device such as a cellular phone running a control application or using a web browser interface can be used to control a home automation system, such as to set or program the temperature, view power consumption, or perform other such functions. It is desired to better use the communication capabilities in devices such as phones, cars, and other electronic systems to interact with and control home automation such as utilities.

SUMMARY

Some example embodiments of the invention comprise a system or method for providing wireless mobile device data to a building control system. One such example method includes sending location data from a wireless mobile device to an Internet-based service, receiving the location data from the wireless mobile device in the Internet-based service, determining an associated building control system from the wireless mobile device identity, sending data derived from the location data to the building control system, and implementing a change in the building control system based on the sent data derived from the location data.

BRIEF DESCRIPTION OF THE FIGURES

FIG. 2 is a flowchart of an example method of operating an Internet service-based home controller in response to mobile wireless device data, consistent with an example embodiment of the invention.

DETAILED DESCRIPTION

Figure 1:
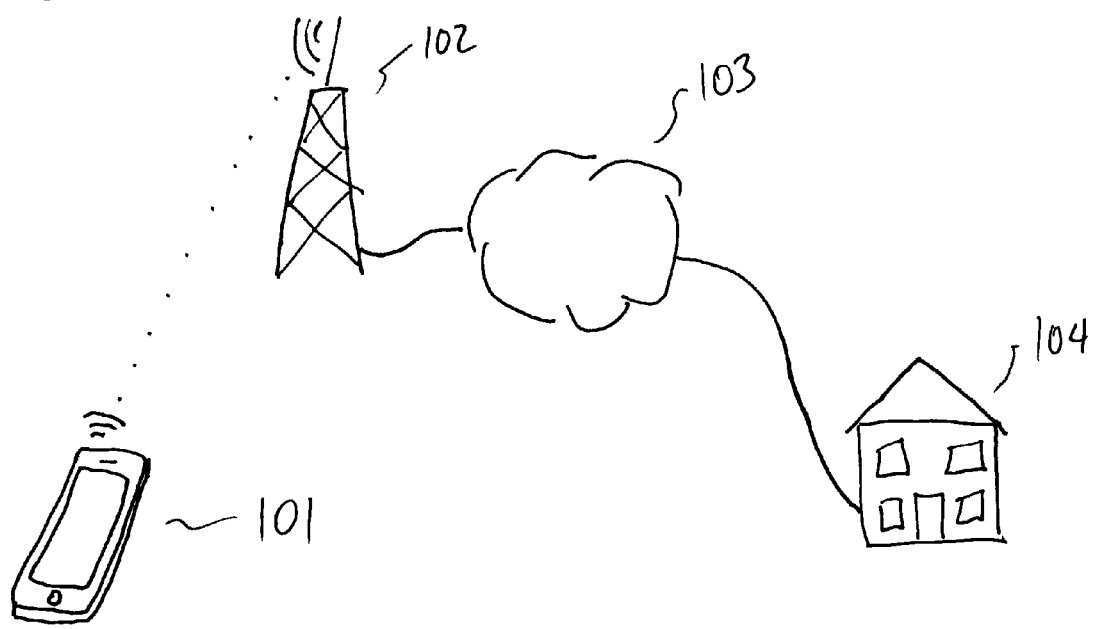
FIG. 1 shows an example of using a mobile RF device to provide position and time information to a building controller, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Home automation systems have evolved into capable and complex systems that can not only enable a user to set utility functions such as air temperature, humidity, and water heater temperature, but include the ability to set programs for different times of day, days of the week, or vacations, as well as to monitor utility operation and resource usage such as water used or electricity consumed. Such systems enhance the ability of a homeowner or user to control their environment, and to conserve resources by ensuring heat, air conditioning, lighting, and other resources are used efficiently.

This typically includes programming a system such as a smart thermostat or computerized control system to change the temperature so that heating or air conditioning expenses are minimized while people are out of the house, and to power cycle devices such as air conditioners to ensure that resource consumption does not exceed availability during peak hours. But, they do not account for daily variations in schedule, such as being away on vacation, working late, or being home ill during a workday in controlling utilities. Similarly, a family may watch a movie in a family room one night, while playing games at a kitchen or dining room table another night, and have different temperature or other demands in different spaces within the home on different days.

Some example embodiments of the present invention therefore seek to provide better responsiveness in a home automation system to user activities, such as by utilizing one or more mobile electronic devices to provide input to or control such a home automation system. For example, a person carrying a cellular telephone can be detected on the basis of the Bluetooth, Wi-Fi, nearfield communication, or cellular network signals being sent from the cellular phone, and the presence of an automobile can be detected by detecting its Bluetooth, cellular data network, or other such wireless data communication systems.

This enables the home automation system to detect the presence or location of the members of the household carrying these electronic devices, or the presence or absence of the vehicles in which they travel at the home. The home automation system can then alter settings such as security, lighting, heating and air conditioning, and the like to compensate for the activities of the people residing in the home.

In a more detailed example, a person wakes up and begins to move around the house at a typical time of 7 a.m. on weekdays, determined by the controller's monitoring of movement within the house such as by a smart phone moving or a person switching lights on in rooms. The HVAC system therefore alters its settings from an overnight energy conserving setting to a setting designed to bring at least certain areas of the house commonly used by the homeowner on weekday mornings such as the master bedroom and bathroom areas to a desired temperature by 7 a.m.

In this example, the homeowner leaves the master suite by 7:30, carrying his smart phone in his pocket. The home automation system detects a signal from the smart phone, such as a Wi-Fi, nearfield communication, cellular data signal, or Bluetooth signal leaving the master suite area, and returns the master suite area to an energy conserving temperature and eventually turns any remaining lights or appliances such as a television off.

The home automation system then detects via signals from a carried smart phone that the homeowner deviates from his normal routine as he brings breakfast and coffee from the kitchen to a home office or study, causing the home automation system to bring the temperature in the home office from an energy saving level to a desired temperature for occupied spaces. When the homeowner leaves the office, the office returns to its previous energy conserving state, and the homeowner exits the house and enters the garage.

Because the home automation system knows the homeowner nearly always leaves the house in a vehicle after entering the garage around 8 a.m. on a weekday morning, the home automation system uses nearfield communication signals from the smart phone to detect that the homeowner has left the house and is now in the garage, and opens the garage door and locks the door from the garage to the house. In a further example, the home automation system detects that the homeowner's car has left, either by absence of a signal such as Wi-Fi or Bluetooth, or by detecting such a signal fading away as the vehicle leaves the area of the house, causing the home automation system to close the garage door the homeowner has inadvertently left open.

When the person arrives home from work and approaches the house, the garage door opens as a result of detecting a Wi-Fi, Bluetooth, or other signal from the car, permitting the homeowner to drive into the garage without needing to manually actuate a garage door opener. Detection of a person's arrival also causes the HVAC system to alter its programming from a state designed to conserve power to a state designed to provide the desired interior temperature for occupied spaces. When the homeowner exits the car and approaches the entry door, nearfield communications (NFC) signals from his smart phone cause the door to unlock, permitting entry to the home without the need to manually unlock the door with a key. The house's heating and cooling systems bring commonly used rooms to a desired occupancy temperature if not already done, and a home security system is disarmed.

These examples illustrate how a computerized controller such a home automation system, security system, smart thermostat, or the like can use information from mobile RF devices such as a smart phone or a car to track the location of the mobile device and adjust the home environment accordingly.

In another example, the mobile RF device further includes a position-time agent or service executing on the device, such that it is operable to communicate time and location information to the home automation system periodically. This can be done over time, such as every five or ten minutes, or can be triggered by other events such as significant movement of the mobile device. This position and time data are communicated to the home automation controller, or are sent to an Internet-based service that makes the information securely available to authorized client devices such as the home security system, a smart thermostat, or other such devices.

FIG. 1 shows an example of using a mobile RF device to provide position and time information to a building controller, consistent with an example embodiment of the invention. A smart phone 101 communicates with a cellular phone network tower 102, and obtains time of day information from the cell tower. The smart phone 101 further uses one or more cell phone towers having a known location with a determined time of signal flight between the smart phone 101 and the cell tower 102 to estimate its position, alternatively using global positioning system (GPS) satellite signals to determine its location.

The smart phone 101 therefore can easily determine its time and location using a variety of suitable technologies, and can use an application, driver, or other software to send periodic time and location information via a network. The network in this example comprises communicating via a cellular phone tower 102 to a cellular data network, but in other embodiments comprises using a Wi-Fi connection to the Internet or other such means to communicate. Here, position and time information are conveyed via the cell phone tower 102 to an Internet service 103, which receives and logs the information.

The position and time information conveyed to the Internet service are here recorded in a cloud-based service, such as a distributed system of Internet servers that are operable to receive information from many mobile electronic devices such as cellular telephone 101 and to communicate this information to appropriate clients. The client in this example is a home 104, which is associated with the mobile device 101 through the Internet service 103. In other embodiments, the client 104 can be a hotel or office building such that the mobile RF device can control access or environment, a vehicle such that the mobile RF device can control entry or other features or track location, and other such authorized clients.

Communication between the client, such as a home energy management system (HEMS), and the mobile wireless device can be controlled in a number of ways, such as by providing a user account on the Internet service 103 through which the user can associate his controller with one or more wireless devices. In a further example, different wireless devices are associated with different people, such that a husband who prefers relatively cool spaces may trigger different home energy usage profiles with his movements than a woman who prefers relatively warm spaces.

The time and position information provided from the mobile device 101 to the Internet service in a further embodiment comprise less or additional information, such as indicating a local event such as using near field communication (NFC) to unlock a door, the presence or absence of a Wi-Fi network through which larger sets of data can be exchanged, or other such data as needed. Access to the data can be controlled by association via a password-controlled user account, via secure connection to a known home energy management system, or through other such suitable means in various embodiments The Internet service 103 in some embodiments derives from this mobile wireless device information an action to be performed via the home energy management system, such as increasing the temperature in an occupied room or turning lights off in a vacant room, while in other embodiments the information from the wireless mobile device is passed from the service to the home energy management system which determines what action to take.

Information is communicated from the Internet service 103 to the home energy management system or other controller in this example via a network connection to a home gateway, such as a ZigBee or DigiMesh gateway coupled to a home Internet connection. Communication between devices within the home, such as the HVAC system, security system, and other devices is provided by the mesh network. The mesh network enables devices to communicate with each other and with external networks via the mesh network gateway, which in this example serves as a controller or as a gateway to a home energy management system controller that can be located within the home, within the Internet service 103, or elsewhere.

The user can view, configure, and alter information from the home energy management system or Internet service 103 used to alter the home's environment in response to the wireless mobile device data, such as by addressing the appropriate controller via a web interface, via an application running on the wireless mobile device, or through other suitable means. This enables customization of controller response to mobile wireless device data, as well as monitoring of energy usage, current home energy state, and other such information. In home environments with multiple people, further examples may provide different home energy profiles or responses to mobile wireless device data depending on who is associated with the mobile wireless device providing the data.

Although the example of FIG. 1 shows a home 104 as the facility that is automated in response to mobile wireless device data, other embodiments will include other features and automated systems. For example, a frequent traveler who checks in to a hotel and is assigned a room may use his mobile wireless device nearfield communication capability to provide access to his room, retrieve known environment preference information for the guest, and enable the guest to use other services such as load an exercise program on a fitness center treadmill, present user-specific entertainment or dining options to the guest, or load media such as a default channel on the television or present a customized user desktop on a business center computer. When the guest enters the room, for example, the room can bring itself to a temperature known to be preferred by the specific guest with whom the wireless mobile device is associated, bring a television, computer, or other system to a desired page or channel, and the wireless mobile device can be used to track the guest's presence in the room to reduce energy consumption when the guest is away.

FIG. 2 is a flowchart of an example method of operating an Internet service-based home controller in response to mobile wireless device data, consistent with an example embodiment of the invention. At 201, a wireless mobile device such as a smart phone, vehicle, or other device executes an application or service that periodically sends position and time information to an Internet service. Sending this information is triggered in some embodiments by a change in state of the mobile device, such as detecting that the device is within range of a home Wi-Fi signal, use of the device to perform some action at the house such as to unlock a door using nearfield communication, or a change in time or position since the last information was sent such as sending when the device moves by more than a few feet or sending every five minutes.

The position and time information is communicated to the Internet service via wireless communication, such as via a cellular data network, a Wi-Fi Internet connection, or another suitable means of data communication. This information is received in the Internet service at 202, and the Internet service processes the received information to associate the received information with a particular user, building, or other registered entity. The Internet service then applies rules or actions against the incoming data at 203, calculating any actions to be sent to the homeowner's residence.

The actions determined at 203 are sent from the Internet service to the home energy management system at 204, such as by sending an action message over the Internet to the home's wireless mesh networking gateway or controller so that the action message can be relayed from the mesh network gateway to the end device or devices, such as a smart thermostat, home security system, lighting, a pool pump, or another such device. The device then receives the message and applies the indicated action, and in a further embodiment returns conformation of receipt of the message to the Internet service via the mesh network, gateway, and home Internet connection.

In a further example, the mesh network devices further report information back to the Internet service, such as indicating that a wireless mobile device was used to open a locked door, report temperature or other environmental conditions, or to report energy usage. Other example embodiments include other data exchange between a mobile wireless device and a networked building device via the Internet service, such as sounding a tone on a smart phone when a doorbell is rung or providing an interface on a smart phone to set or monitor home environment or security states via the Internet service.

These examples illustrate how a wireless mobile device can be used to communicate information such as position and time via a wireless network to a building control system, such as a home energy management system or a home automation controller. The wireless mobile device can also be used to provide access control, to convey a device user's custom environment preferences to different environments such as hotel rooms, or for other such purposes.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A method of providing wireless mobile device data to a building control system, comprising:
   sending location data from a wireless mobile device to an Internet-based service, wherein the location data identifies the location of the wireless mobile device;
   receiving the location data from the wireless mobile device in the Internet-based service;
   determining an associated building control system from the wireless mobile device identity;
   sending data derived from the location data to the building control system, wherein the sent data derived from the location data comprises an instruction to change the state of an element of the building control system; and
   implementing a change in the building control system based on the sent data derived from the location data.

2. The method of providing wireless mobile device data to a building control system of claim 1, wherein the sent data derived from the location data comprises at least one of location data, time the location data was determined, and identity of a user associated with the wireless mobile device.

3. The method of providing wireless mobile device data to a building control system of claim 1, wherein the wireless mobile device is associated with a specific person.

4. The method of providing wireless mobile device data to a building control system of claim 3, wherein the change implemented in the building control system is dependent on the person associated with the wireless mobile device.

5. The method of providing wireless mobile device data to a building control system of claim 1, wherein sending location data from a wireless mobile device comprises sending at least one of cellular network, wi-fi, Bluetooth, or nearfield communication data.

6. The method of providing wireless mobile device data to a building control system of claim 1, wherein implementing a change in the building control system comprises at least one of changing a temperature, changing lighting, locking or unlocking a door, changing security system settings, and changing media settings.

7. A method of using wireless mobile device data to change a building control system, comprising:
   receiving location data from a wireless mobile device in an Internet-based service, wherein the location data identifies the location of the wireless mobile device;
   determining an associated building control system from the wireless mobile device identity; and
   sending data derived from the location data to the building control system, wherein the sent data derived from the location data comprises an instruction to change the state of an element of the building control system, such that the building control system can implement a change based on the sent data derived from the location data.

8. The method of using wireless mobile device data to change a building control system of claim 7, wherein the sent data derived from the location data comprises at least one of location data, time the location data was determined, and identity of a user associated with the wireless mobile device.

9. The method of using wireless mobile device data to change a building control system of claim 7, wherein the wireless mobile device is associated with a specific person.

10. The method of using wireless mobile device data to change a building control system of claim 9, wherein the change implemented in the building control system is dependent on the person associated with the wireless mobile device.

11. The method of using wireless mobile device data to change a building control system of claim 7, wherein receiving location data from a wireless mobile device comprises receiving at least one of cellular network, wi-fi, Bluetooth, or nearfield communication data from the wireless mobile device.

12. The method of using wireless mobile device data to change a building control system of claim 7, wherein implementing a change in the building control system comprises at least one of changing a temperature, changing lighting, locking or unlocking a door, changing security system settings, and changing media settings.

13. A network-based building control management system, comprising:
   a wireless mobile device interface module operable to receive location data from a wireless mobile device in an Internet-based service, wherein the location data identifies the location of the wireless mobile device;
   a device identification module operable to determine an associated building control system from the wireless mobile device identity; and
   a building control system interface module operable to send data derived from the location data to the building control system, such that the building control system can implement a change based on the sent data derived from the location data, wherein the sent data derived from the location data comprises an instruction to change the state of an element of the building control system.

14. The network-based building control management system of claim 13, wherein the sent data derived from the location data comprises at least one of location data, time the location data was determined, and identity of a user associated with the wireless mobile device.

15. The network-based building control management system of claim 13, wherein the wireless mobile device is associated with a specific person.

16. The network-based building control management system of claim 15, wherein the change implemented in the building control system is dependent on the person associated with the wireless mobile device.

17. The network-based building control management system of claim 13, wherein receiving location data from a wireless mobile device comprises receiving at least one of cellular network, wi-fi, Bluetooth, or nearfield communication data from the wireless mobile device.

18. The network-based building control management system of claim 13, wherein implementing a change in the building control system comprises at least one of changing a temperature, changing lighting, locking or unlocking a door, changing security system settings, and changing media settings.

* * * * *